(12) United States Patent
Lee et al.

(10) Patent No.: US 8,514,360 B2
(45) Date of Patent: Aug. 20, 2013

(54) LCD DEVICE

(75) Inventors: Dong Hoon Lee, Gumi-si (KR); Kee Seok Choi, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 432 days.

(21) Appl. No.: 11/289,505

(22) Filed: Nov. 30, 2005

(65) Prior Publication Data

US 2006/0125990 A1    Jun. 15, 2006

(30) Foreign Application Priority Data

Dec. 14, 2004  (KR) .......................... 10-2004-105480

(51) Int. Cl.
*G02F 1/1343*    (2006.01)

(52) U.S. Cl.
USPC ......................................................... 349/141

(58) Field of Classification Search
USPC ......................................................... 349/141
See application file for complete search history.

(56) References Cited

U.S. PATENT DOCUMENTS

| | | | | |
|---|---|---|---|---|
| 4,812,387 A | * | 3/1989 | Suzuki et al. | 430/311 |
| 5,548,424 A | * | 8/1996 | Takao et al. | 349/106 |
| 5,695,690 A | * | 12/1997 | Swirbel et al. | 252/582 |
| 5,943,107 A | * | 8/1999 | Kadota et al. | 349/44 |
| 2004/0125301 A1 | * | 7/2004 | Lee | 349/141 |
| 2004/0263752 A1 | * | 12/2004 | Kim | 349/141 |
| 2005/0174527 A1 | * | 8/2005 | Rey-Mermet | 349/190 |
| 2006/0001802 A1 | * | 1/2006 | Kao | 349/106 |

FOREIGN PATENT DOCUMENTS

| EP | 1376209 A1 | * | 1/2004 |
|---|---|---|---|
| KR | 1020000058018 A | | 9/2000 |

\* cited by examiner

*Primary Examiner* — Mark Robinson
*Assistant Examiner* — Jerry Blevins
(74) *Attorney, Agent, or Firm* — McKenna Long & Aldridge LLP

(57) ABSTRACT

An LCD device and a method for manufacturing the same are disclosed in which if an overcoating layer is not formed on a color filter substrate, a gap between exposed pigments is filled with a column spacer material to increase a process margin. The LCD device includes first and second substrates facing each other, gate and data lines formed on the second substrate to cross each other, thereby defining pixel regions, a thin film transistor (TFT) formed in each portion where the gate lines cross the data lines, common and pixel electrodes alternately formed in the pixel regions, a black matrix layer formed on the first substrate to cover the gate lines, the data lines and the thin film transistor, color filter layers of a plurality of color films having a stripe shape and spaced apart from one another at a predetermined interval, wherein the color films partially overlap the black matrix layer, a filling pattern formed in regions between the respective color films, a column spacer formed on the black matrix layer and a predetermined portion of the color filter layers, and a liquid crystal layer formed between the first and second substrates.

3 Claims, 17 Drawing Sheets

LCD DEVICE

This application claims the benefit of the Korean Patent Application No. P2004-105480, filed on Dec. 14, 2004, which is hereby incorporated by reference as if fully set forth herein.

BACKGROUND OF THE INVENTION

1. Field of the Invention

The present invention relates to a liquid crystal display (LCD) device, and more particularly, to an LCD device and a method for manufacturing the same in which if an overcoating layer is not formed on a color filter substrate, a gap between exposed pigments is filled with a column spacer material to increase a process margin.

2. Discussion of the Related Art

Demands for various display devices have increased with the development of an information based society. Accordingly, many efforts have been made to research and develop various flat display devices such as liquid crystal display (LCD), plasma display panel (PDP), electroluminescent display (ELD), and vacuum fluorescent display (VFD). Some species of flat display devices have already been applied to displays for various equipment.

Among the various flat display devices, liquid crystal display (LCD) devices have been most widely used due to advantageous characteristics of a thin profile, light weight, and low power consumption. The LCD devices provide a substitute for a Cathode Ray Tube (CRT). In addition to mobile type LCD devices such as a display for a notebook computer, LCD devices have been developed for computer monitors and televisions to receive and display broadcasting signals.

In order to use LCD devices in various fields as a general display, the key to developing LCD devices depends on whether LCD devices can implement a high quality picture, such as high resolution and high luminance with a large-sized screen, while still maintaining the characteristics such as lightness in weightness, thin profile, and low power consumption.

Hereinafter, a related art LCD device will be described with reference to the accompanying drawings.

FIG. 1 is an exploded perspective view illustrating a related art twisted nematic (TN) mode LCD device.

As shown in FIG. 1, the related art TN mode LCD device includes first and second substrates 1 and 2 bonded to each other with a certain space therebetween, and a liquid crystal layer 3 formed by injection, between the first and second substrates 1 and 2. The first and second substrates 1 and 2 and the liquid crystal layer 3 are referred to as a liquid crystal panel.

In more detail, the first substrate 1 includes a plurality of gate lines 4 arranged along a first direction at fixed intervals and a plurality of data lines 5 arranged along a second direction perpendicular to the first direction at fixed intervals. A plurality of pixel regions P are defined by the gate and data lines 4 and 5. A plurality of electrodes 6 are arranged within the pixel regions P. A plurality of thin film transistors T are formed at regions where the gate lines cross the data lines and apply data signals of the data lines 5 to the pixel electrodes in accordance with signals supplied to the gate lines.

The second substrate 2 includes a black matrix layer 7 that prevents light from portions except the pixel regions P, R/G/B color filter layers 8 formed to correspond to the pixel regions, for displaying various colors, and a common electrode 9 for producing the image on the color filter layers 8.

In the aforementioned LCD device, the liquid crystal layer 3 is formed between the first and second substrates 1 and 2, wherein liquid crystal molecules of the liquid crystal layer 3 are driven by an electric field generated between the pixel electrode 6 and the common electrode 9. That is, an alignment direction of the liquid crystal molecules of the liquid crystal layer 3 is controlled by an induced electric field thereto. Accordingly, light irradiated through the liquid crystal layer 3 may be controlled by the alignment direction of the liquid crystal molecules, thereby displaying the image.

This kind of LCD device is referred to as a TN mode LCD device. The TN mode LCD has disadvantageous characteristics such as a narrow viewing angle. In order to overcome this problem of the narrow viewing angle, an in-plane switching (IPS) mode LCD device has been actively developed.

Hereinafter, a related art IPS mode LCD device provided with column spacers will be described with reference to the accompanying drawings.

FIG. 2 is a plan view illustrating the related art IPS mode LCD device, and FIG. 3 is a structural sectional view taken along line I~I' of FIG. 2.

As shown in FIG. 2 and FIG. 3, the related art IPS mode LCD device includes first and second substrates 30 and 40 bonded to each other with a certain space, and a liquid crystal layer 55 formed between the first and second substrates 30 and 40 by injection. The first and second substrates 30 and 40 and the liquid crystal layer 55 are referred to as a liquid crystal panel.

The Related Art IPS mode LCD device has the same structure as that of the aforementioned related art TN mode LCD device of FIG. 1 except that the common electrode of the second substrate in the TN mode LCD device is replaced with an overcoating layer.

In more detail, the first substrate 30 includes a plurality of gate lines 31 arranged along a first direction at fixed intervals and a plurality of data lines 32 arranged along a second direction perpendicular to the first direction at fixed intervals. A plurality of pixel regions P are defined by the gate and data lines 31 and 32. A plurality of thin film transistors (TFT) are formed at regions where the gate lines cross the data lines. Pixel electrodes 33 and common electrodes 35a are alternately formed in the pixel regions.

The common electrodes 35a are formed in parallel with the data lines 32 and forked from common lines 35 formed to be flush with the gate lines 32.

Each of the thin film transistors includes a gate electrode 31a extended from the gate line 31, a semiconductor layer 34 formed to cover the gate electrode 31a, a source electrode 32a extended from the data line 32 to correspond to both sides of the semiconductor layer 34, and a drain electrode 32b spaced apart from the source electrode 32a at a predetermined interval.

A gate insulating film 36 is formed on an entire surface of the first substrate 30 including the gate lines 31 and the data lines 32 to insulate respective metal lines from each other. A passivation film 37 is formed on the gate insulating film 36 including the data lines 32.

Also, the second substrate 40 facing the first substrate 30 includes a black matrix layer 41 that prevents light from portions (portions for gate and data lines and thin film transistors) except the pixel regions, R/G/B color filter layers 42 formed to correspond to the pixel regions, and an overcoating layer 43 for planarizing an entire surface of the second substrate 40 including the color filter layers 42. A plurality of column spacers 50 are formed on a predetermined portion of the overcoating layer 43 to maintain a cell gap between the first and second substrates 30 and 40.

The respective column spacers 50 are spaced apart from each other at constant intervals to correspond to the gate lines 31. The column spacers 50 support the first and second substrates 30 and 40 to maintain the cell gap.

Meanwhile, the related art LCD devices have been manufactured by a liquid crystal injection method.

The liquid crystal injection method will now be described in brief.

First, an LCD panel and a container having liquid crystal material therein are provided in a chamber, wherein the chamber is maintained in a vacuum state. That is, moisture and air bubbles of the liquid crystal material and the container are removed simultaneously, and an inside space of the LCD panel is maintained in a vacuum state. Then, a liquid crystal injection inlet of the LCD panel is dipped into the container having the liquid crystal material in the vacuum state, and the vacuum state inside the chamber is changed to an atmospheric pressure. Thus, the liquid crystal material is injected to the inside of the LCD panel through the liquid crystal injection inlet according to a pressure difference between the inside of the LCD panel and the chamber.

However, the LCD device manufactured by the liquid crystal injection method has the following disadvantages.

First, after cutting the substrate into the respective LCD panel regions, the liquid crystal injection inlet is dipped into the container having the liquid crystal material while maintaining the vacuum state between the two substrates. Thus, it takes a great amount of time to inject the liquid crystal material between the two substrates, thereby lowering yield.

Second, in case of forming a large sized LCD device, it is difficult to completely inject the liquid crystal material into the inside of the LCD panel, thereby causing the failure due to incomplete injection of the liquid crystal material.

Third, it takes a great amount of time to inject the liquid crystal material, and it requires a large space for liquid crystal injection devices.

Fourth, in a case of using ball spacers, a defect occurs in which individual ball spacers are conglomerated with each other to twinkle. Alternatively, since the ball spacers are dispersed within pixels, light leakage occurs.

The above problems of the liquid crystal injection method have become serious due to the trend manufacturing large sized LCD panels. In order to overcome the problems of the liquid crystal injection method, a liquid crystal dispersion method has been developed. In the dispersion method, two substrates are bonded to each other after dispersing liquid crystal material on either one of the two substrates.

In the related art IPS mode LCD device, the overcoating layer formed on the color filter substrate to planarize the substrate is thick and its material cost is high. Therefore, efforts to remove the overcoating layer have been suggested.

SUMMARY OF THE INVENTION

Accordingly, the present invention is directed to an LCD device and a method for manufacturing the same, which substantially obviate one or more problems due to limitations and disadvantages of the related art.

An advantage of the present invention is to provide an LCD device and a method for manufacturing the same in which if an overcoating layer is not formed on a color filter substrate, a gap between exposed pigments is filled with a column spacer material to increase a process margin.

Additional advantages and features of the invention will be set forth in part in the description which follows and in part will become apparent to those having ordinary skill in the art upon examination of the following or may be learned from practice of the invention. The advantages of the invention will be realized and attained by the structure particularly pointed out in the written description and claims hereof as well as the appended drawings.

To achieve these and other advantages and in accordance with the purpose of the invention, as embodied and broadly described herein, an LCD device according to the present invention includes first and second substrates facing each other, gate and data lines formed on the second substrate to cross each other, thereby defining pixel regions, a thin film transistor (TFT) formed in each portion where the gate lines cross the data lines, common and pixel electrodes alternately formed in the pixel regions, a black matrix layer formed on the first substrate to cover the gate lines, the data lines and the thin film transistor, color filter layers of a plurality of color films having a stripe shape and spaced apart from one another at a predetermined interval, the color films partially overlap the black matrix layer a filling pattern formed in regions between the respective color films, a column spacer formed on the black matrix layer and a predetermined portion of the color filter layers, and a liquid crystal layer formed between the first and second substrates.

In another aspect of the present invention, a method for manufacturing an LCD device includes preparing first and second substrates having a display region and a non-display region located outside the display region, forming a black matrix layer on a predetermined portion of the first substrate, forming a plurality of color films having a striped shape and spaced apart from one another at a predetermined interval on the first substrate including the black matrix layer, forming a photo-hardening resin on an entire surface of the first substrate including the black matrix layer and the color films at a predetermined thickness, aligning a mask on the first substrate to define a semi-transmitting portion in the regions between the plurality of color films and a transmitting portion on a predetermined portion of the black matrix layer, selectively removing the photo-hardening resin using the mask to form a column spacer in a portion corresponding to the transmitting portion and a filling pattern in a portion corresponding to the semi-transmitting portion, forming a thin film transistor array on the second substrate, forming a seal pattern in the non-display region of one of the first and second substrates, dispersing a liquid crystal on the second substrate, and bonding the first and second substrates to each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

A method for manufacturing an LCD device according to the present invention is based on a liquid crystal dispersion method suitable for a large sized LCD panel.

Figure 1:
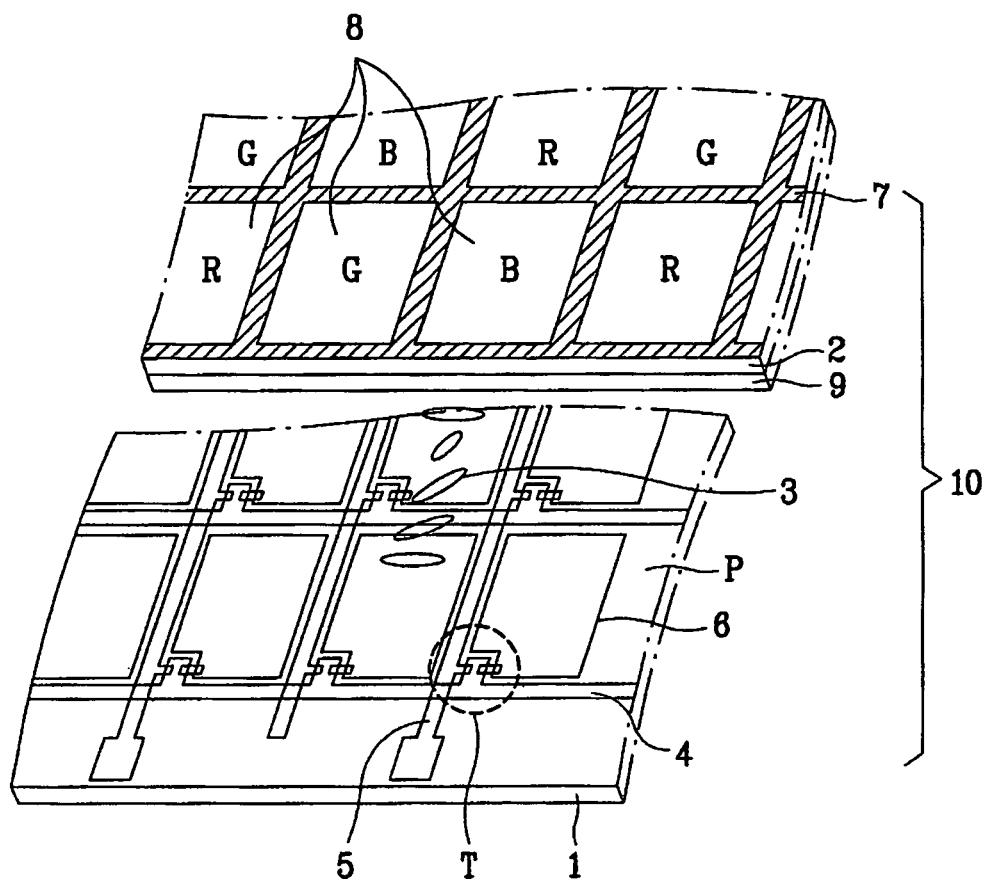
FIG. 1 is an exploded perspective view illustrating a related art TN mode LCD device.
Figure 2:
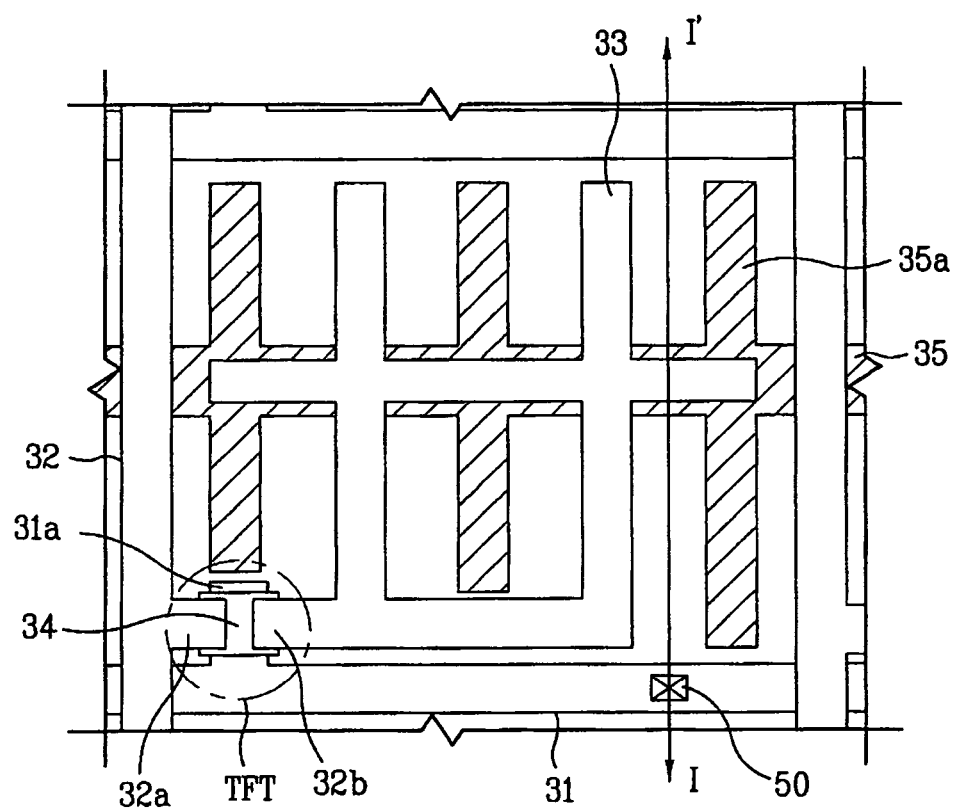
FIG. 2 is a plan view illustrating a related art IPS mode LCD device.
Figure 3:
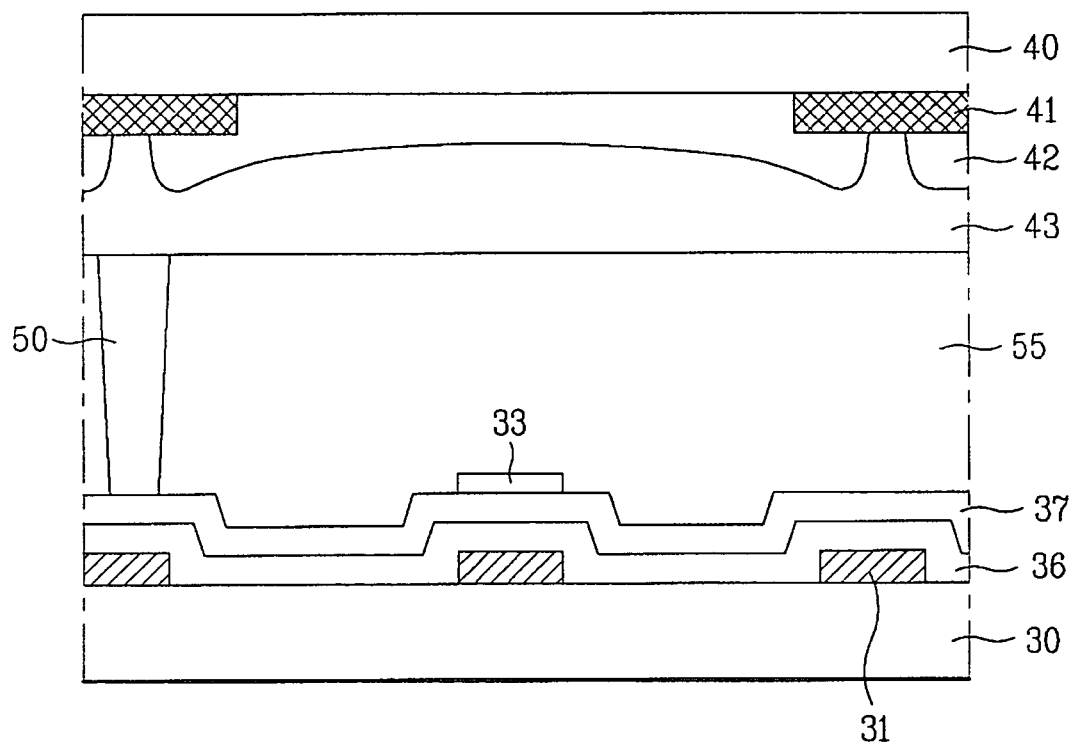
FIG. 3 is a structural sectional taken along line I~I' of FIG. 2.
Figure 4:
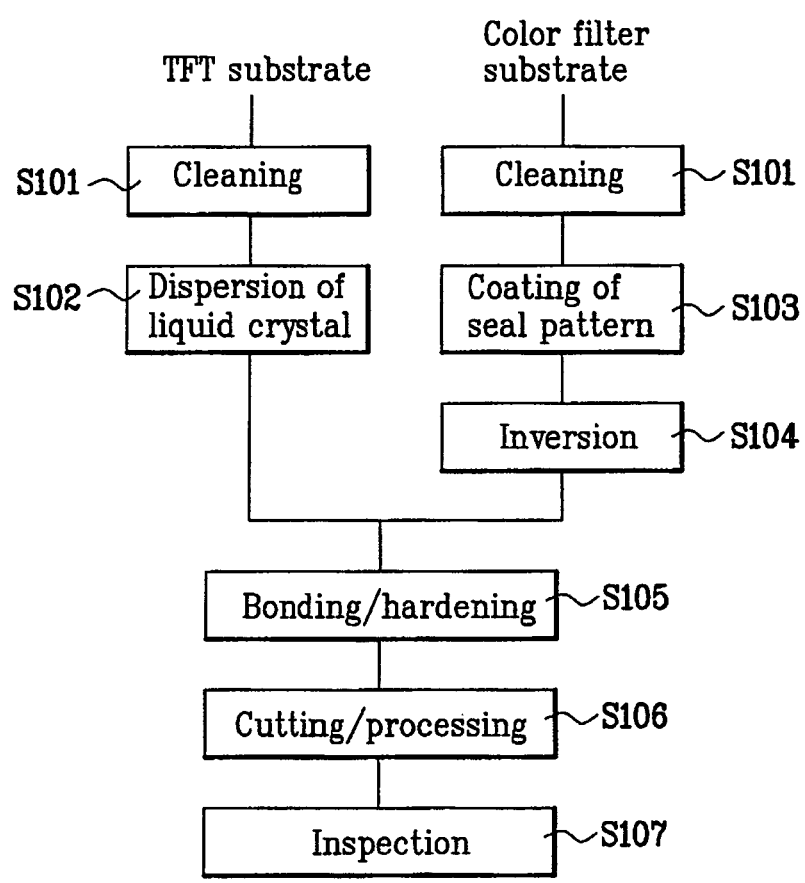
FIG. 4 is a flow chart illustrating a liquid crystal dispersion method.

FIG. 4 is a flow chart illustrating a liquid crystal dispersion method.

As shown in FIG. 4, the liquid crystal dispersion method is carried out in such a manner that two substrates are bonded to each other after dispersing liquid crystal material on either one of the two substrates.

First, a color filter array is formed on a color filter substrate while a TFT array is formed on a TFT substrate.

Column spacers are formed on a predetermined region of the color filter substrate. Alignment layers are respectively coated on entire surfaces of the TFT substrate and the color filter substrate including the column spacers, and a rubbing process is performed thereto.

After cleaning the TFT substrate and the color filter substrate (S101), the liquid crystal material is dispersed on one of the two substrates (S102), and a seal pattern is formed in the circumference of an LCD panel region on the other of the two substrates by a dispensing device (S103).

At this time, it is possible to perform dispersion of the liquid crystal and formation of the seal pattern on any one of the two substrates.

After the other substrate having no dispersion of the liquid crystal material is inversed (S104), the TFT substrate and the color filter substrate are bonded to each other by pressure, and the seal patterned is hardened (S105).

Subsequently, the bonded substrates are cut into the respective LCD panels (S106). Also, an inspection process (S107) for an external appearance and an electric failure in the LCD panel is performed, so that the process of manufacturing the LCD device is completed.

In the liquid crystal dispersion method, the column spacers are used. This is to prevent a problem caused by ball spacers. That is, in case where the ball spacers are used, the following problem occurs. The liquid crystal is dispersed between the TFT substrate and the color filter substrate when the two substrates are bonded to each other. At this time, the ball spacers move to one place along a dispersion direction of the liquid crystal, thereby failing to maintain a uniform cell gap. Thus, instead of the ball spacers, the column spacers fixed to the substrate are used.

In this case, the column spacers are fixed to the color filter substrate and adjoin the TFT substrate. The portions of the column spacers adjoining the TFT substrate are formed on the color filter substrate at constant heights to correspond to a single line of any one of the data and common lines.

Meanwhile, in the same manner as the related art IPS mode LCD device, an overcoating layer formed on the color filter substrate to planarize the substrate is thick and its material cost is high. Therefore, efforts to remove the overcoating layer have been suggested.

Hereinafter, an LCD device from which an overcoating layer is removed will be described.

Figure 5:
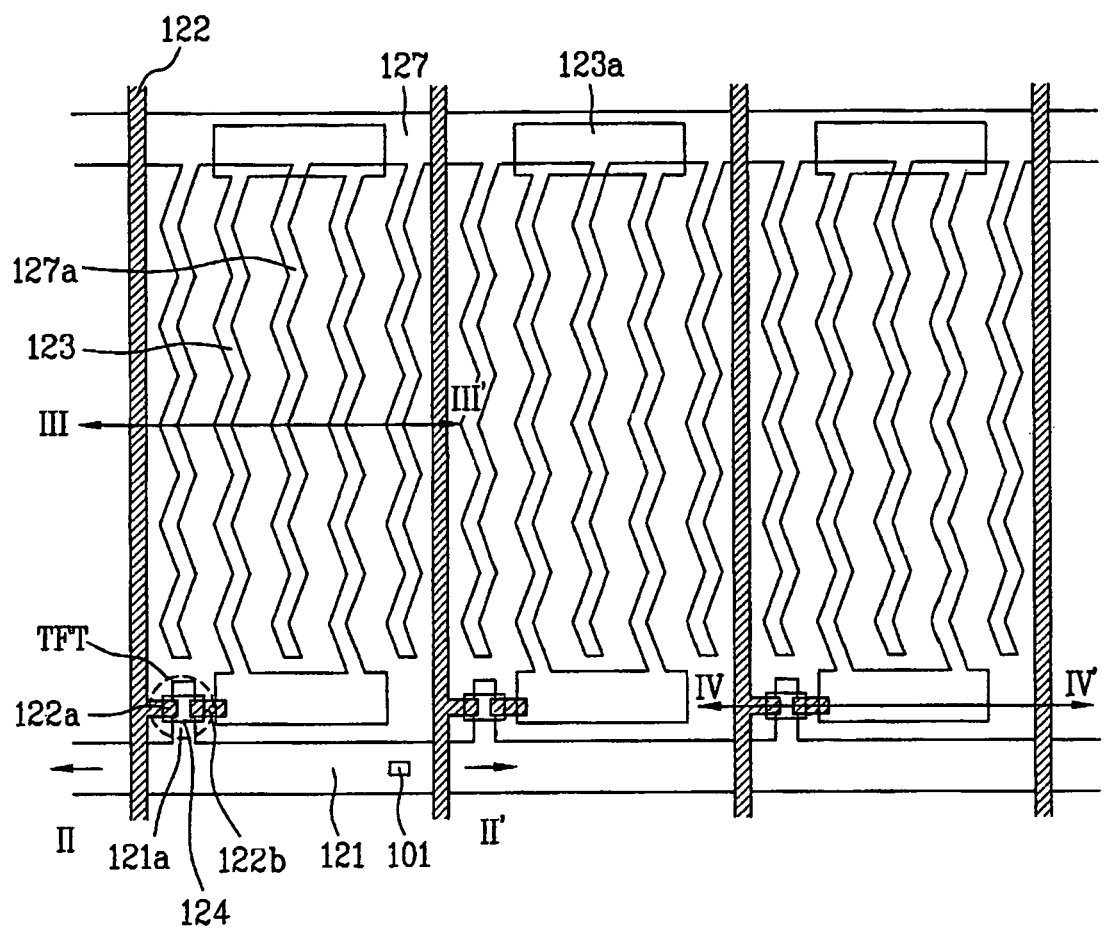
FIG. 5 is a plan view illustrating a TFT substrate of an LCD device according to the present invention.
Figure 6A:
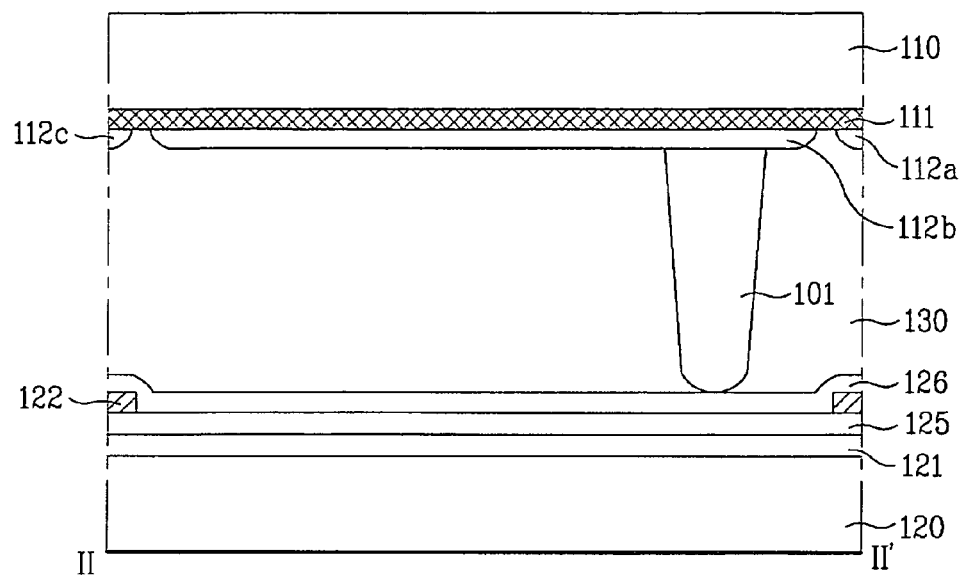
FIG. 6A is a structural sectional taken along line II~II' of FIG. 5, illustrating both a color filter substrate having no overcoating layer and a TFT substrate facing the color filter substrate.
Figure 6B:
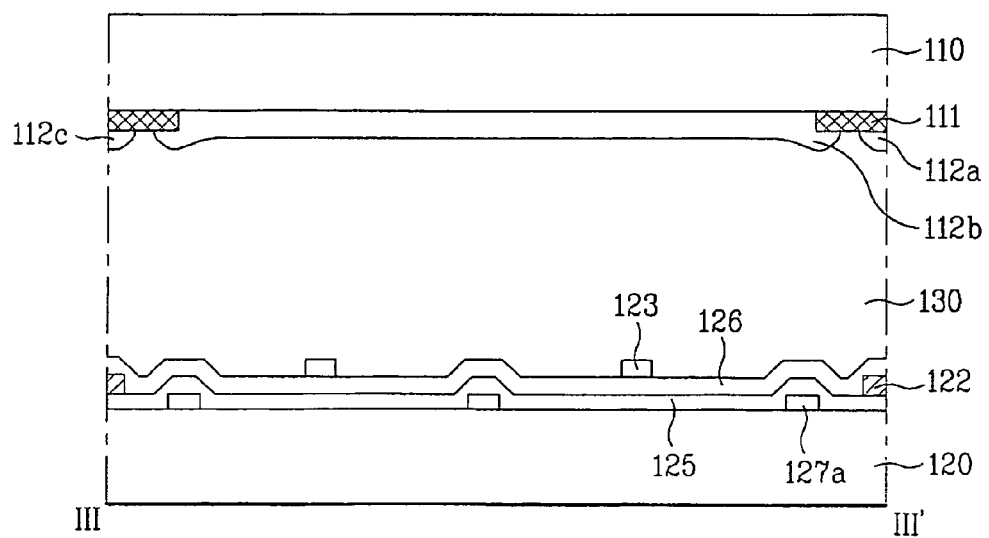
FIG. 6B is a structural sectional taken along line III~III' of FIG. 5, illustrating both a color filter substrate having no overcoating layer and a TFT substrate facing the color filter substrate.

FIG. 5 is a plan view illustrating the TFT substrate of the LCD device according to the present invention, FIG. 6A is a structural sectional taken along line II~II' of FIG. 5, illustrating both the color filter substrate having no overcoating layer and the TFT substrate facing the color filter substrate, and FIG. 6B is a structural sectional taken along line III~III' of FIG. 5, illustrating both the color filter substrate having no overcoating layer and the TFT substrate facing the color filter substrate.

As shown in FIG. 5, the TFT substrate of the LCD device according to the present invention includes a second substrate 120, a plurality of gate lines 121 and data lines 122 arranged to vertically cross each other so as to define pixel regions, and common electrodes 127a and pixel electrodes 123 alternately formed in the pixel regions. The common electrodes 127a are forked from common lines 127 parallel with the gate lines 121.

Thin film transistors are formed in regions where the gate lines 121 cross the data lines 122. Each of the thin film transistors includes a gate electrode 121a extended from the gate line 121, a semiconductor layer 124 having an island shape formed to cover the gate electrode 121a, a source electrode 122a extended from the data line 122, and a drain electrode 122b spaced apart from the source electrode 122a at a predetermined interval.

Meanwhile, the color filter substrate from which the overcoating layer is removed, as shown in FIG. 6A and FIG. 6B, includes a black matrix layer 111 formed on a first substrate 110 to correspond to non-pixel regions (regions for gate and data lines and thin film transistors), and color filter layers 112a, 112b and 112c formed with a stripe shape (vertical line) to correspond to the pixel regions. The color filter layers are formed of R/G/B color films 112a, 112b and 112c sequentially arranged. In this case, the respective color films 112a, 112b and 112c are formed to pass through the pixel regions in parallel with the respective data lines 122. The color films 112a, 112b and 112c are overlapped with the black matrix layer 111 at a predetermined width as shown in FIG. 6B.

Since the overcoating layer is not formed in the structure shown in FIG. 6A and FIG. 6B, the overlapped portion where the black matrix layer 111 overlaps the color filter layers 112a, 112b and 112c are relatively thicker than the portion where the color filter layers 112a, 112b and 112c are only formed or the portion where the black matrix layer 111 is only formed. Therefore, the overlapped portion is higher from the first substrate 110 than the other portions. Particularly, since the color filter layers are generally higher than the black matrix layer 111, a step difference is more seriously generated due to the overlapped portion between the black matrix layer 111 and the color filter layers 112a, 112b and 112c. For example, when the black matrix layer 111 is formed at a thickness of 1000 Å and the color filter layers are formed at a thickness of 3000 Å to 4000 Å, the step difference between the portion where the black matrix layer 111 is only formed and the overlapped portion where the black matrix layer 111 overlaps the color filter layers 112a, 112b and 112c reaches 3000 Å to 4000 Å.

A column spacer 101 is formed on a predetermined portion of the color filter layers. A surface (opposite to the TFT substrate) of the column spacer 101 is rounded. This is to reduce a contact area between the column spacer and the TFT substrate, thereby reducing a frictional force.

Generally, if an LCD panel provided with the column spacer is touched along a predetermined direction, one of two substrates of the LCD panel is shifted at a predetermined interval along the touched direction. At this time, since it takes a long time to restore the substrate to the original state, a touch defect such as opaque spots occurs around the touched portion for a time to restore the substrate to the original state. The touch defect is caused by a frictional force between the column spacer and its opposing substrate.

The column spacer 101 shown in FIG. 6A has the rounded surface to minimize the contact area with the TFT substrate to reduce the frictional force. Therefore, the substrate is easily restored to the original state when the LCD panel is touched as above.

Referring to FIG. 6A and FIG. 6B, the gate lines 121, the common lines 127 and the common electrodes 127a are to be flush with one another on the TFT substrate. A gate insulating film 125 is interposed between the gate line 121 and the data line 122, between the common line 127 and the data line 122 and between the common electrode 127a and the data line 122. A passivation film 126 is further interposed between the data line 122 and a pixel electrode 123.

Figure 7:
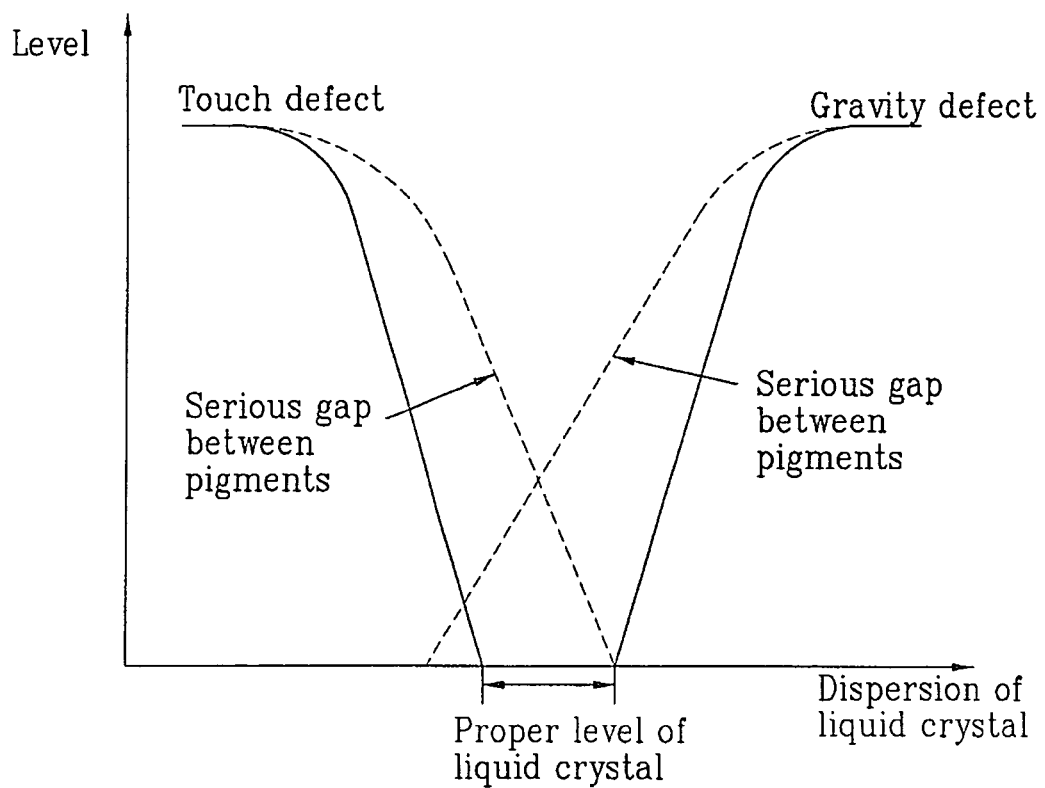
FIG. 7 is a graph illustrating levels of a touch defect and a gravity defect in a case where an overcoating layer is removed.

FIG. 7 is a graph illustrating levels of a touch defect and a gravity defect in a case where the overcoating layer is removed.

In the liquid crystal dispersion method, if the liquid crystal is dispersed in a large volume, a surplus liquid crystal increases. In this case, the gravity defect seriously occurs. By contrast, if the liquid crystal decreases, the gravity defect decreases but the touch defect increases.

Therefore, considering the trade-off relation between the gravity defect and the touch defect, a proper dispersion level of the liquid crystal is required to minimize both the gravity defect and the touch defect.

Referring to a graph of FIG. 7, it is noted that the proper dispersion level of the liquid crystal is gradually reduced because both the touch defect and the gravity defect seriously occur if a gap between pigments becomes deeper. This is because it is difficult to consider a proper level of the liquid crystal filled in the gap depending on width and height of the gap due to an uneven surface if the gap between the region where the color films of the color filter layers are formed and the other regions is exposed.

Hereinafter, the LCD device and the method for manufacturing the same will be described, in which the gap between the respective color films is filled with a column spacer material to reduce a surface step difference of the color filter substrate.

Figure 8A:
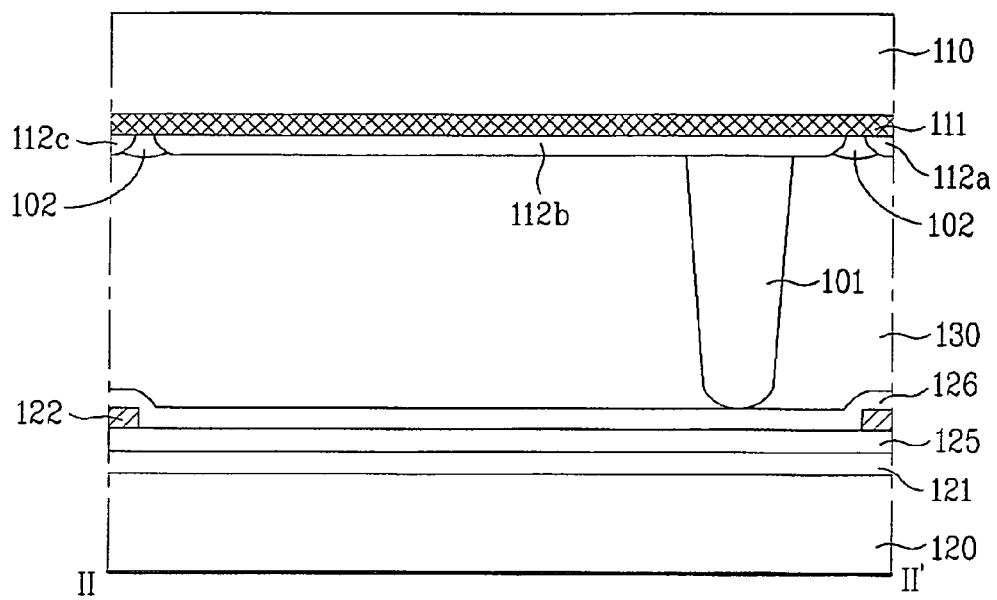
FIG. 8A is a structural sectional taken along line II~II' of FIG. 5, illustrating an LCD device according to the present invention.
Figure 8B:
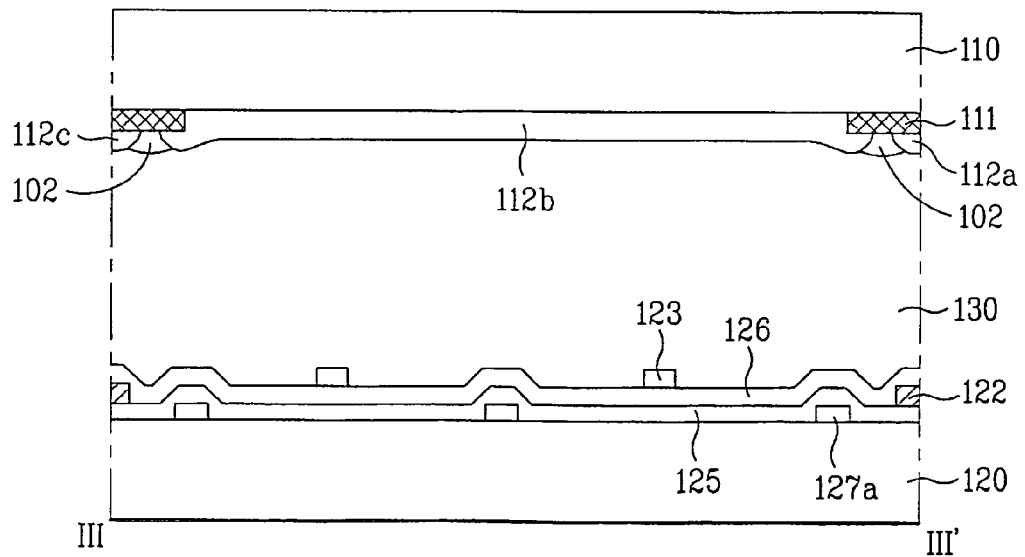
FIG. 8B is a structural sectional taken along line III~III' of FIG. 5, illustrating an LCD device according to the present invention.
Figure 8C:
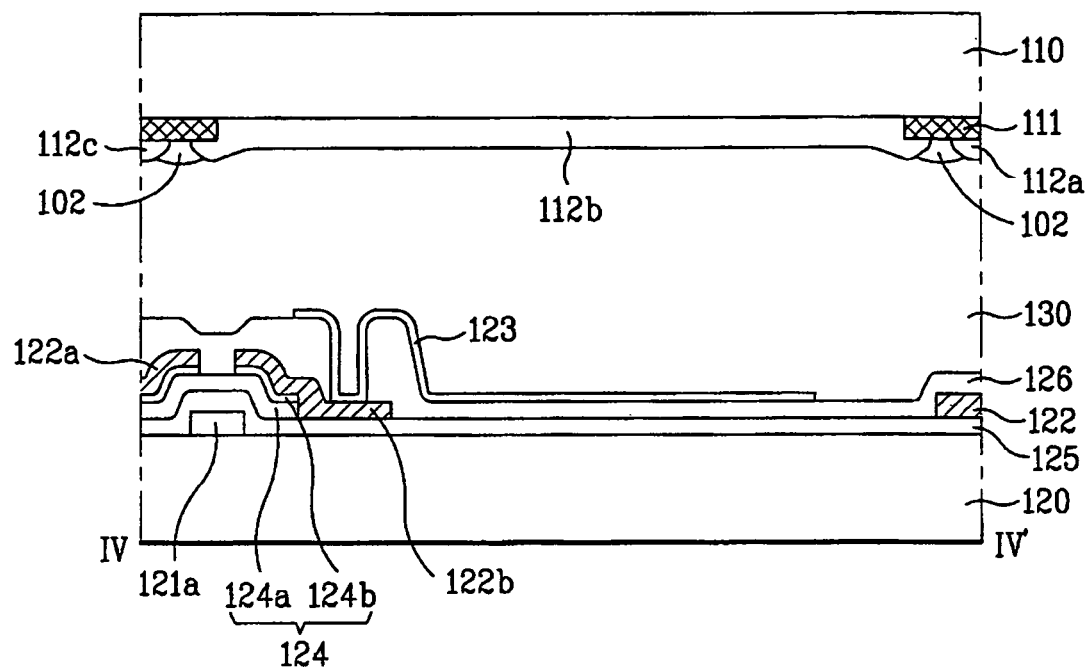
FIG. 8C is a structural sectional taken along line IV~IV' of FIG. 5, illustrating an LCD device according to the present invention.

FIG. 8A is a structural sectional taken along line II~II' of FIG. 5, illustrating the LCD device according to the present invention, FIG. 8B is a structural sectional taken along line III~III' of FIG. 5, illustrating the LCD device according to the present invention, and FIG. 8C is a structural sectional taken along line IV~IV' of FIG. 5, illustrating the LCD device according to the present invention.

As shown in FIG. 5, and FIG. 8A to FIG. 8C, the LCD device according to the present invention includes first and second substrates 110 and 120 bonded to each other with a certain space, and a liquid crystal layer 130 formed between the first and second substrates 110 and 120 by injection.

In more detail, the first substrate 110 includes a black matrix layer 111 that prevents light from portions (portions for gate and data lines and thin film transistors) except the pixel regions, and color filter layers of R/G/B color films 112a, 112b and 112c for displaying colors to correspond to the pixel regions. The respective color films 112a, 112b and 112c pass through the pixel regions in parallel with the respective data lines 122 and are formed with a stripe shape (vertical line). As shown in FIG. 8B, the color films 112a, 112b and 112c are overlapped with the black matrix layer 111 at a predetermined width.

A column spacer 101 is formed on a predetermined portion of the first substrate 110 corresponding to the gate line 121. The column spacer 101 is formed on the black matrix layer and the color filter layers. The column spacer 101 may be formed above the data line 122 or the common line 127. Since the color filter layers have a stripe shape and partially pass through the gate line 121 as shown, the column spacer 101 is formed on the color filter layers. If the column spacer 101 is formed above the data line as the case may be, the column spacer may be formed on the black matrix layer 111.

Furthermore, in the LCD device of the present invention, a filling pattern 102 having the same material as that of the column spacer is formed in regions between the respective color films 112a, 112b and 112c. In this case, the filling pattern 102 has the same thickness as that of the color films. After the filling pattern 102 is formed, the gap between the respective color films 112a, 112b and 112c is filled. Therefore, the step difference between the region where the color films are formed and the other regions is minimized. The filling pattern 102 is formed in parallel with its adjacent color films.

As shown in FIG. 6A, a surface of the column spacer 101 opposite to the TFT substrate is rounded. This is to reduce a contact area between the column spacer and the TFT substrate. Thus, a frictional force between the TFT substrate and the column spacer is minimized to prevent the touch defect from occurring.

The column spacer 101 and the filling pattern 102 are formed of a material such as a photo-hardening resin. The column spacer 101 is formed at a thickness of a cell gap, and the filling pattern 102 is formed at a thickness corresponding to the color films 112a, 112b and 112c.

The column spacer 101 and the filling pattern 102 may be formed of either a photo-hardening resin such as photoacryl or polyimide at a low dielectric ratio of 2.0 or less. This is not to affect driving of the liquid crystal because the column spacer 101 exists in the liquid crystal layer 130.

Meanwhile, the TFT array substrate facing the color filter array substrate includes a plurality of gate lines 121 and data lines 122 arranged to vertically cross each other so as to define pixel regions, common electrodes 127a and pixel electrodes 123 alternately formed in the pixel regions to generate IPS, and thin film transistors formed in regions where the gate lines 121 cross the data lines 122. The common electrodes 127a are forked from common lines 127 parallel with the gate lines 121. The pixel electrodes 123 are forked from a storage electrode 123a overlapped with the common line 127.

As shown in FIG. 8C, each of the thin film transistors includes a gate electrode 121a extended from the gate line 121, a semiconductor layer 124 having an island shape formed to cover the gate electrode 121a, a source electrode 122a extended from the data line 122, and a drain electrode 122b spaced apart from the source electrode 122a at a predetermined interval. The semiconductor layer 124 is formed in such a manner that an amorphous semiconductor layer 124a and an impurity layer 124b are deposited. The impurity layer 124b adjoins the source and drain electrodes 122a and 122b.

A gate insulating film 125 is formed on the entire surface of the substrate including the gate line 121, the gate electrode 121a, the common line 127 and the common electrode 127a. A passivation film 126 is formed on the gate insulating film 125 including the data line 122 and the source and drain electrodes 123a and 123b.

A hole is formed in the passivation film 126 so that the drain electrode 123b is partially exposed. The pixel electrode 123 is in contact with the drain electrode 123b through the hole.

The pixel electrodes 123 are formed to alternate with the common electrodes 127a. The pixel electrodes 123 may be formed to be flush with the data lines 122. Alternatively, the pixel electrodes 123 may be formed so as not to be flush with the data lines 122 as shown.

At this time, the common electrodes 127a may cross the pixel electrodes 123 in a straight line. Alternatively, the common electrodes and the pixel electrodes 123 may be formed in a zigzag arrangement as shown.

Figure 9:
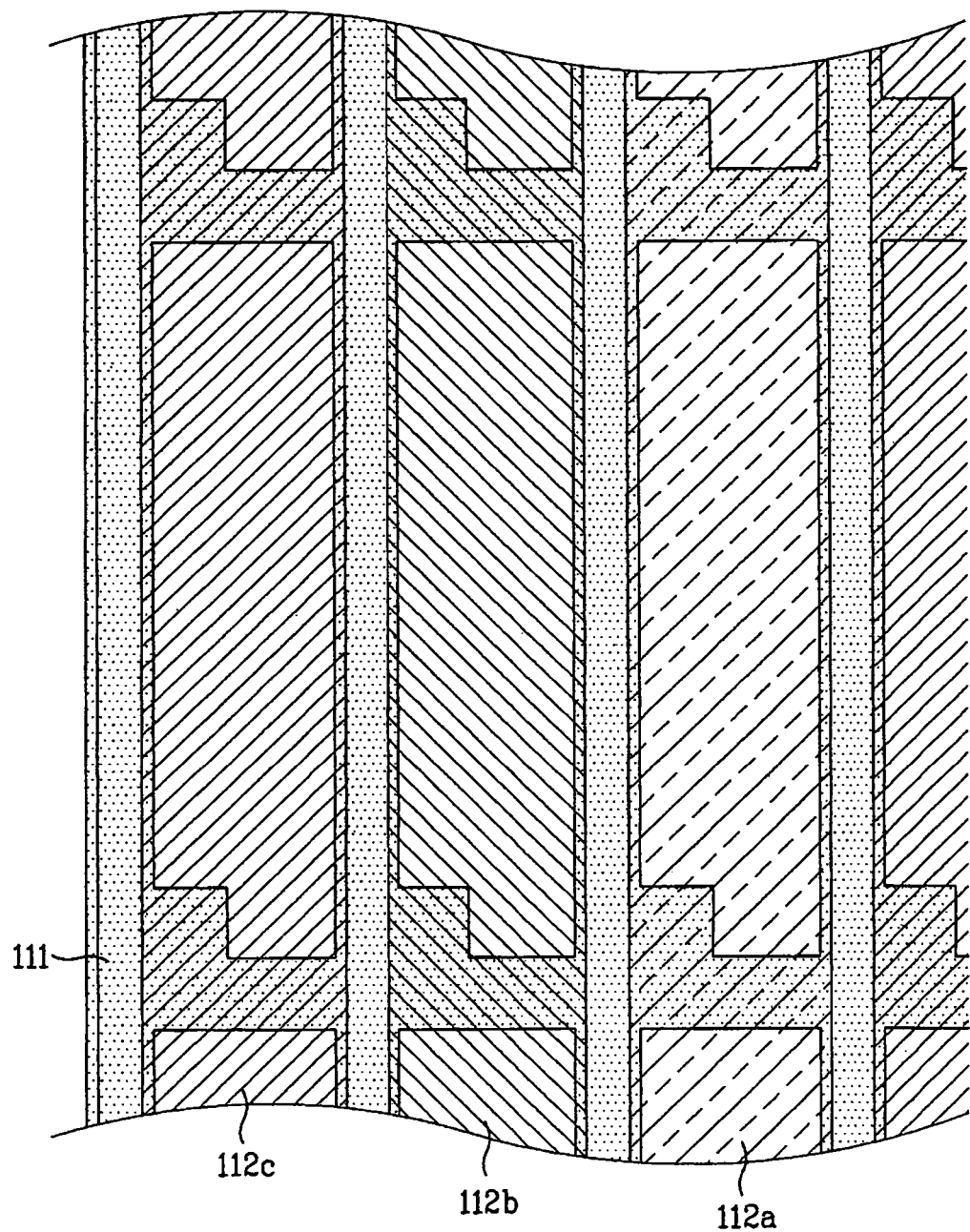
FIG. 9 is a plan view illustrating a color filter substrate of an LCD device according to the present invention.
Figure 10:
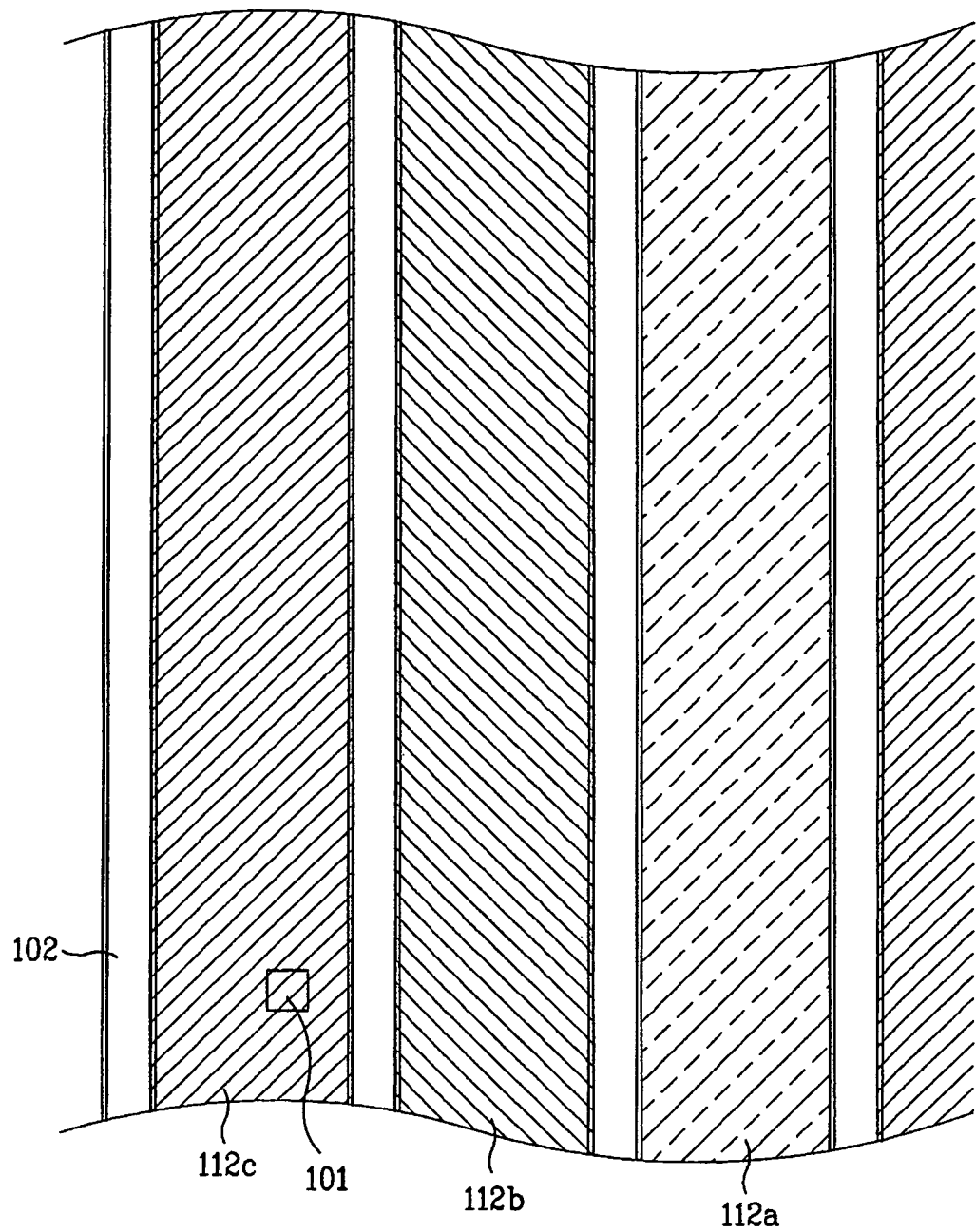
FIG. 10 is a plan view illustrating a column spacer and a filling pattern formed on a color filter substrate of FIG. 9.

FIG. 9 is a plan view illustrating the color filter substrate of the LCD device according to the present invention, and FIG. 10 is a plan view illustrating the column spacer and the filling pattern formed on the color filter substrate of FIG. 9.

As shown in FIG. 9, in the LCD device according to the present invention, the black matrix layer 111 is formed to correspond to non-pixel regions, i.e., regions of the gate and data lines 121 and 122 and thin film transistors. The R/G/B color films 112a, 112b and 112c having stripe shapes are formed to pass through the pixel regions in parallel with the data lines 122. At this time, the color films 112a, 112b and 112c are partially overlapped with the black matrix layer 111 in a vertical direction.

As shown in FIG. 10, the filling pattern 102 is formed in a region (corresponding to the data lines) corresponding to the regions between the respective color films 112a, 112b and 112c, i.e., the black matrix layer 111. The column spacer 101 is formed to correspond to a predetermined portion of the gate line 121.

At this time, the filling pattern 102 has a height corresponding to the thickness of its adjacent color films 112a, 112b and 112c. The height of the filling pattern 102 is relatively lower than the height of the column spacer 101 corresponding to the cell gap. The region for the column spacer in a mask 150 (see FIG. 11) for the column spacer 101 and the region for the filling pattern are separately defined to generate the height difference. In this way, the height difference between the column spacer and the filling pattern is caused even if they are formed of the same material as each other.

Meanwhile, since the exposed region of the black matrix layer 111 is covered with the filling pattern 102, the color films 112a, 112b and 112c, the column spacer 101 and the filling pattern 102 are only shown in FIG. 10.

Hereinafter, the mask for the column spacer and the filling pattern will be described with reference to the accompanying drawings.

Figure 11:
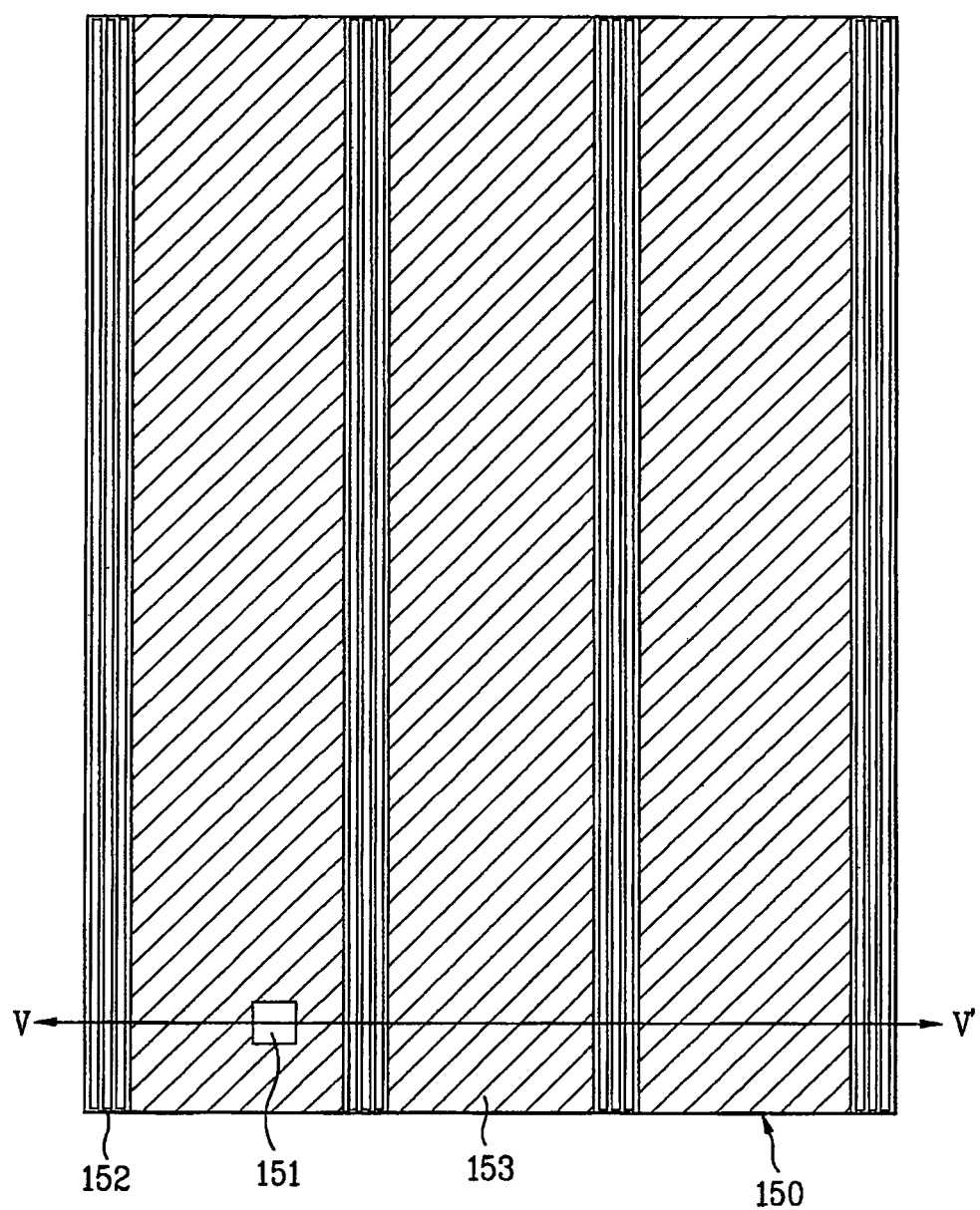
FIG. 11 is a plan view illustrating a mask used to manufacture an LCD device according to the first embodiment of the present invention.
Figure 14:
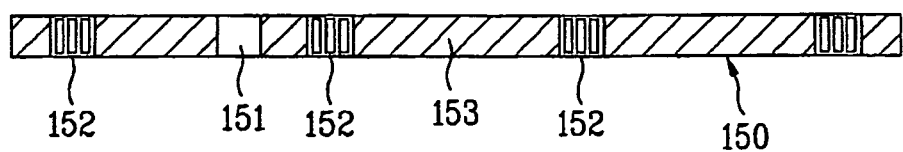
FIG. 14 is a structural sectional taken along line V~V' of FIG. 11.

FIG. 11 is a plan view illustrating the mask used to manufacture the LCD device according to the first embodiment of the present invention, and FIG. 14 is a structural sectional taken along line V~V' of FIG. 11.

As shown in FIG. 11 and FIG. 14, the mask 150 for the column spacer according to the first embodiment of the present invention includes a transmitting portion 151 defined to correspond to the portion for the column spacer, a semi-transmitting portion 152 defined to correspond to the black matrix layer of the vertical direction, and a light-shielding portion 153 corresponding to the other portions.

The mask 150 is suitable for the column spacer 101 of a negative photo-hardening resin or a negative photoresist film for the column spacer 101. If the column spacer is formed of a positive photo-hardening resin or a positive photoresist film for the column spacer is formed, an inversion mask to the mask 150 is prepared.

The semi-transmitting portion 152 of the mask 150 is provided with a plurality of vertical slits longitudinally formed. At this time, the horizontal length of the vertical slits has a size smaller than resolution of an exposure equipment used to expose the column spacer using the mask, so that the portion corresponding to the semi-transmitting portion is applied with a smaller amount of exposure than that of the transmitting portion by interference. The vertical length of the vertical slits corresponds to the vertical length of display regions (active regions) of the first and second substrates in the LCD panel.

In this case, the size of the transmitting portion 151 is greater than that of the resolution of the exposure equipment so that the portion corresponding to the transmitting portion 151 is fully applied with the exposure amount of the exposure equipment. For example, supposing that the exposure equipment has resolution of 10 μm or so, the transmitting portion has a slit size of 10 μm×10 μm or grater, and the semi-transmitting portion has a slit size smaller than that of the transmitting portion.

The respective slits of the semi-transmitting portion 152 may be formed at constant intervals or different intervals. The intervals between the respective slits are adjusted to be smaller than resolution of the exposure equipment used for exposure using the mask 150.

Figure 12:
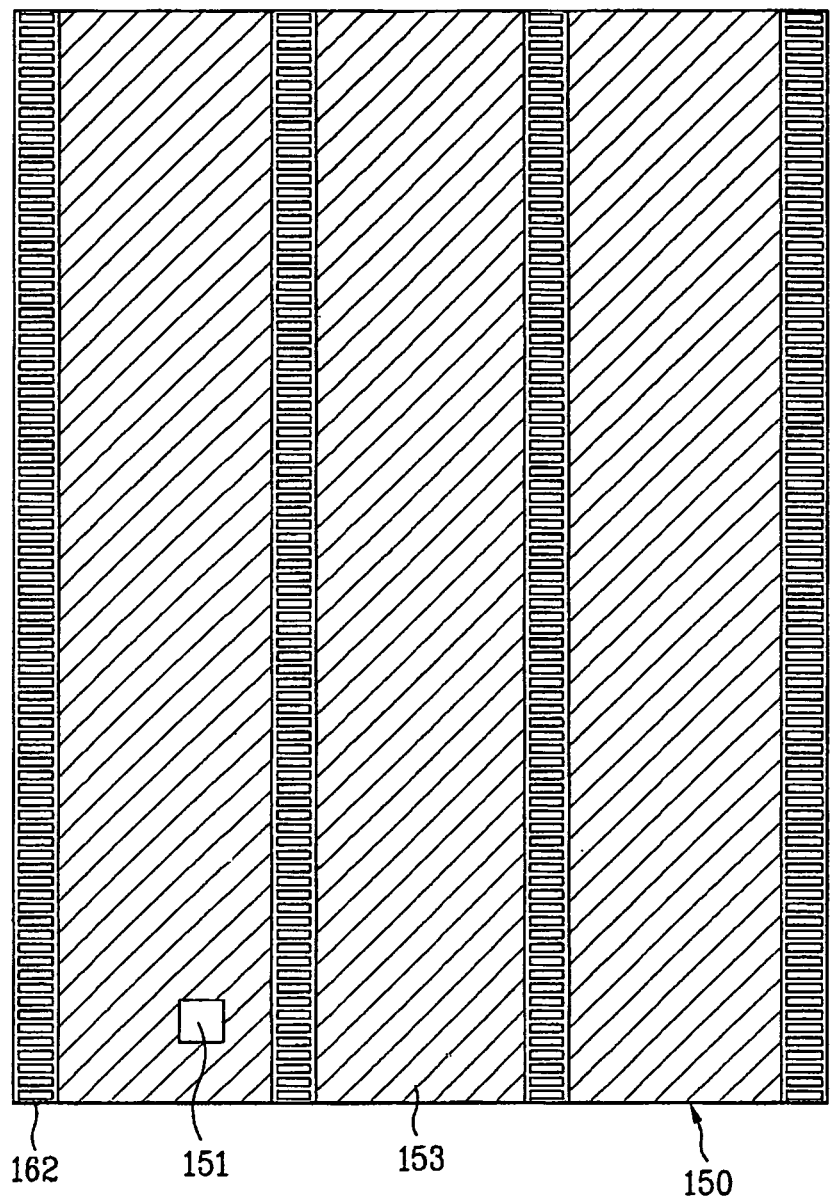
FIG. 12 is a plan view illustrating a mask used to manufacture an LCD device according to a second embodiment of the present invention.

FIG. 12 is a plan view illustrating a mask used to manufacture the LCD device according to the second embodiment of the present invention.

As shown in FIG. 12, the mask used to manufacture the LCD device according to the second embodiment of the present invention is defined by forming a plurality of horizontal slits having a horizontal length longer than a vertical length in a portion corresponding to a semi-transmitting portion 162. A light-shielding portion and a transmitting portion of the mask used to manufacture the method for manufacturing the LCD device according to the second embodiment of the present invention are formed in the same manner as that of the first embodiment. The horizontal length corresponds to the horizontal width of the semi-transmitting portion.

In this case, the width of the horizontal slit is smaller than resolution of the exposure equipment so that the semi-transmitting portion 162 is applied with a smaller amount of exposure than that of the transmitting portion.

Figure 13:
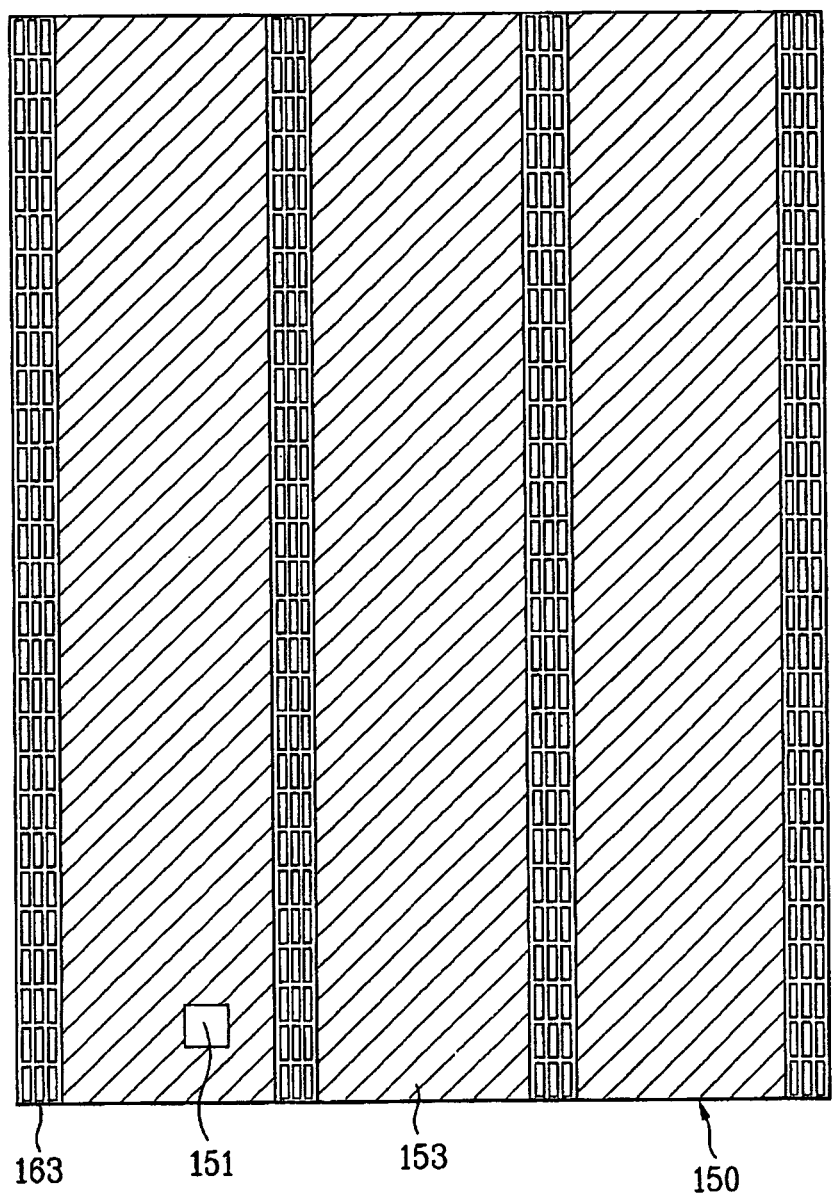
FIG. 13 is a plan view illustrating a mask used to manufacture an LCD device according to a third embodiment of the present invention.

FIG. 13 is a plan view illustrating a mask used to manufacture the LCD device according to the third embodiment of the present invention.

As shown in FIG. 13, in the mask 150 used to manufacture the LCD device according to the third embodiment of the present invention, a semi-transmitting portion 163 is defined by forming a plurality of fine slits. In this case, the horizontal and vertical lengths of the fine slit are smaller than resolution of the exposure equipment using the mask 150.

FIG. 15A to FIG. 15F are sectional views illustrating process steps of manufacturing the LCD device according to the present invention.

Figure 15A:
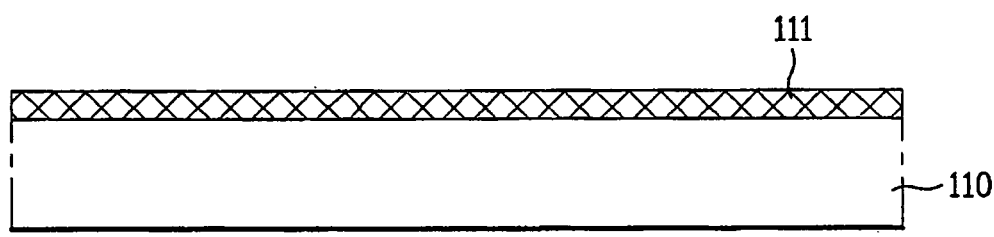
FIG. 15A to FIG. 15F are sectional views illustrating process steps of manufacturing an LCD device according to the present invention.

As shown in FIG. 15A, the black matrix layer 111 is formed on the first substrate 110. The black matrix layer 111, as shown in FIG. 9, is formed to cover the gate line 121, the data line 122, and the thin film transistor on the first substrate 110.

Figure 15B:
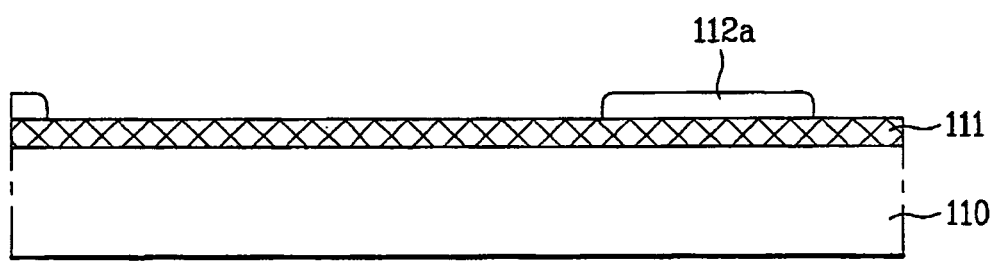

As shown in FIG. 15B, the first color film 112a is formed on a predetermined portion of the first substrate 110.

Figure 15C:
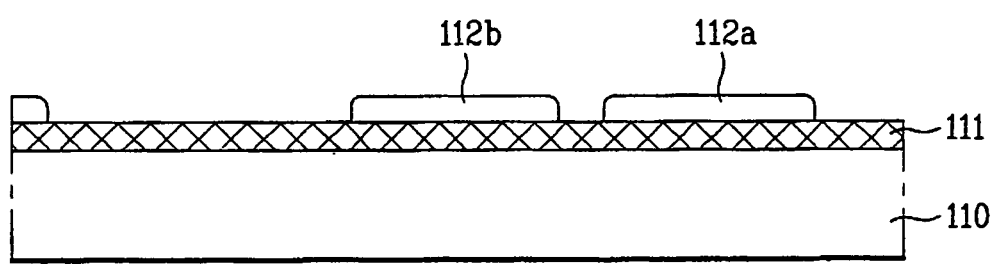

As shown in FIG. 15C, the second color film 112b is formed on a predetermined portion of the first substrate 110.

Figure 15D:
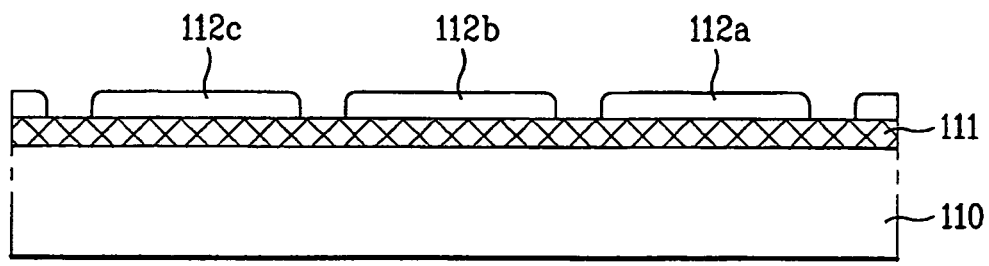

As shown in FIG. 15D, the third color film 112c is formed on a predetermined portion of the first substrate 110.

As shown in FIG. 15B to FIG. 15D, the first to third color films 112a, 112b and 112c are formed with a stripe shape in parallel with the data lines 122.

Figure 15E:
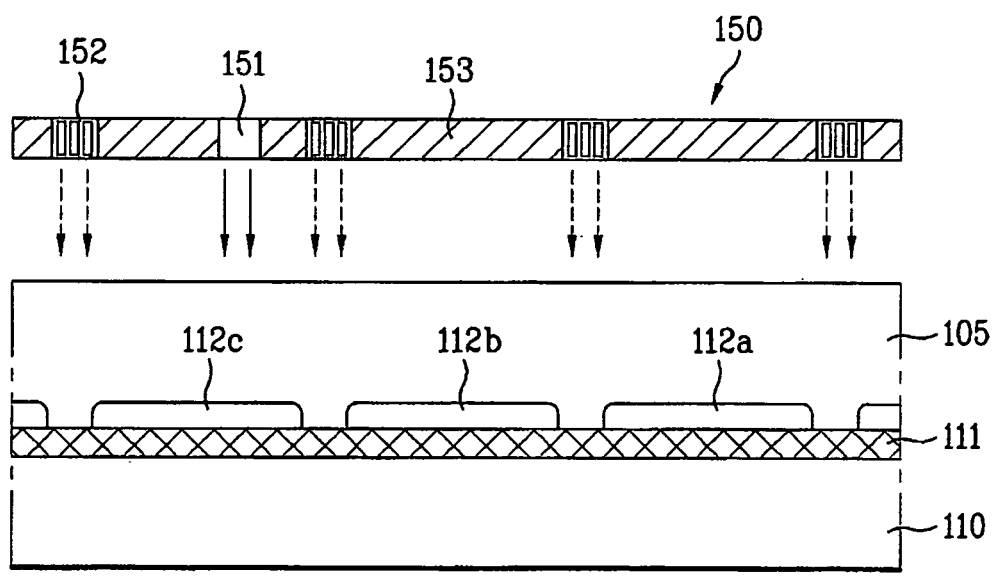

As shown in FIG. 15E, a photo-hardening resin 105 is coated on the entire surface of the first substrate 110 including the first to third color films 112a, 112b and 112c.

Subsequently, the mask 150 is prepared to define the transmitting portion 151 in a predetermined region and the semi-transmitting portion 152 corresponding to the region where the first to third color films 112a, 112b and 112c are not formed. Thus, the mask 150 is arranged on the first substrate 110.

The photo-hardening resin 105 has a thickness corresponding to that of the cell gap of the liquid crystal layer 130 between the first substrate 110 and the second substrate 120. The photo-hardening resin 105 is formed of a negative photo-hardening resin. A positive photo-hardening resin may be used as the case may be. In this case, an inversion mask to the mask as shown is used.

Figure 15F:
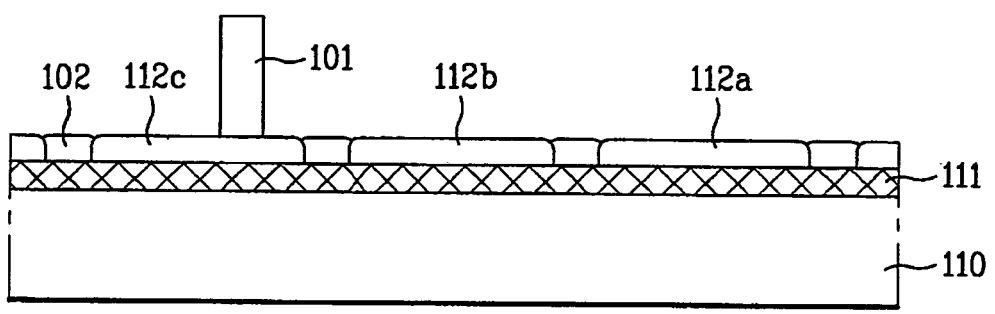

As shown in FIG. 15F, the photo-hardening resin 105 is exposed using the mask 150. At this time, an exposure energy transmitted from the exposure equipment is transferred to the portion of the photo-hardening resin corresponding to the transmitting portion 151. A smaller amount of exposure energy is transferred to the portion of the photo-hardening resin corresponding to the semi-transmitting portion 152.

Therefore, if a developing solution is applied to the photo-hardening resin 105 after exposure, the portion corresponding to the light-shielding portion 153 is removed except the exposed portion of the photo-hardening resin. In this case, the exposed portion corresponding to the transmitting portion 151 fully applied with the exposure energy of the exposure equipment remains as much as the full thickness of the photo-hardening resin 105. The portion corresponding to the semi-transmitting portion 152 partially applied with the exposure energy remains as much as some thickness of the photo-hardening resin 105. The photo-hardening resin 105 remaining to correspond to the transmitting portion 151 becomes the column spacer 101. The photo-hardening resin 106 remaining at a thin thickness between the respective color films 112a, 112b and 112c to correspond to the semi-transmitting portion 152 becomes the filling pattern 102.

At this time, the size, the width and the number of the slits of the semi-transmitting portion 152 in the mask 150 are determined depending on how an irradiation portion through the semi-transmitting portion is required in comparison with an irradiation portion through the transmitting portion. The irradiation portion is determined by the thickness of the portion for the filling pattern.

Meanwhile, the process steps of manufacturing the TFT substrate corresponding to the color filter substrate are as follows.

First, a metal material such as Mo, Al and Cr is deposited on the second substrate 120 by sputtering and then patterned by a photolithographic process to form a plurality of the gate lines 121 and the gate electrodes 121a extended from the gate lines 121. The common lines 127 are formed in parallel with the gate lines 121, and the common electrodes 127a extended from the common lines 127 are formed within the pixel region in a zigzag pattern.

Subsequently, an insulating material such as SiNx is deposited on the second substrate 120 including the gate lines 121 to form the gate insulating film 125. The semiconductor layer material (amorphous silicon and doped silicon) is deposited and patterned on the gate insulating film 125 to form the semiconductor layer 124 on the gate insulating film 125 on the gate electrode 121a. The semiconductor layer 124 is formed in such a manner that an amorphous silicon layer and a silicon layer heavily doped with P are sequentially deposited and then patterned.

Afterwards, a metal material such as Mo, Al and Cr is deposited on the entire surface by sputtering and then patterned by the photolithographic process to form the data lines 122 vertical to the gate lines 121 and at the same time the source and drain electrode 122a and 122b at both sides of the semiconductor layer 124. The source electrode 122a is extended from the data line 122. The doped silicon layer between the source and drain electrodes 122a and 122b is removed when the source and drain electrodes 122a and 122b are patterned.

Next, the passivation film 126 of SiNx is deposited on the entire surface of the substrate including the source electrode 122a and the drain electrode 122b by a chemical vapor deposition (CVD) process. An inorganic material such as SiNx is mainly used as a material of the passivation film 126. Recently, an organic material having a low dielectric ratio, such as BenzoCycloButene (BCB), Spin On Glass (SOG), and acryl, is used as the material of the passivation film 126 to improve an aperture ratio of a liquid crystal cell.

Subsequently, the passivation film 126 on the drain electrode 122b is partially etched to form a contact hole that partially exposes the drain electrode 122b. A transparent conductive film is deposited on the passivation film 126 by sputtering to electrically connect with the drain electrode 122b. The transparent conductive film is selectively removed to remain only in the pixel regions. Thus, the pixel electrodes 123 are formed in the pixel regions in a zigzag pattern to alternate with the common electrodes 127.

Subsequently, although not shown, an alignment layer is coated on the entire surface of the TFT substrate facing the color filter substrate provided with first and second column spacers 101 and 103, and a rubbing process is performed thereto.

Next, the second substrate 120 and the first substrate 110 are respectively cleaned, and the liquid crystal material is dispersed on one of the two substrates. A seal pattern is then formed in the circumference of the LCD panel region on the other of the two substrates by a dispensing device. At this time, it is possible to sequentially perform dispersion of the liquid crystal and formation of the seal pattern on any one of the two substrates. The formation of the seal pattern may be performed before the dispersion of the liquid crystal.

After the other substrate having no dispersion of the liquid crystal material is inversed, the first substrate and the second substrate are bonded to each other by pressure, and the seal patterned is hardened.

Subsequently, the bonded substrates are cut into the respective LCD panels. Also, an inspection process for an external appearance and an electric failure in the LCD panel is performed, so that the process of manufacturing the LCD device is completed.

As described above, the LCD device and the method for manufacturing the same according to the present invention have the following advantages.

In the manufacture of the LCD device, from which the overcoating layer is removed, using the liquid crystal dispersion method, if a gap between the color films is exposed to the liquid crystal layer, it is difficult to obtain a proper level of the liquid crystal in the range that various defects such as the touch defect and the gravity defect are all compensated. This is because the surface of the color filter substrate is not planarized due to the gap between the color films. In this case, unexpected situations such as the liquid crystal filled between the first and second substrates flows in the gap may occur in the manufacture of the LCD device. Therefore, in the present invention, the gap between the color films is filled with the filling pattern having the thickness corresponding to that of the color films when the column spacer is formed. In addition, since the surface of the color filter substrate is planarized, it is possible to increase a margin of the liquid crystal dispersion process (a proper dispersion margin of the liquid crystal).

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. An LCD device comprising:
   a first and a second substrates facing each other;
   a plurality of gate and data lines formed on the second substrate to cross each other, thereby defining pixel regions;
   a plurality of thin film transistors (TFT), one formed in each region, respectively;
   a common and a pixel electrodes alternately arranged in each region;
   a black matrix layer formed on the first substrate to cover the gate lines, the data lines, and the thin film transistors;
   a plurality of color filter layers on the first substrate of a plurality of color films having a stripe shape and spaced apart from one another at a predetermined interval, wherein the color filter layers partially overlap the black matrix layer;
   a filling pattern formed between adjacent color films, wherein the filling pattern has a same thickness as the adjacent color films and planarized to a surface of the adjacent color films on the black matrix layer;
   a column spacer formed on the black matrix layer and a predetermined portion of the color filter layers, wherein the column spacer and the filling pattern are formed with a same material; and
   a liquid crystal layer formed between the first and second substrates.

2. The LCD device according to claim 1, wherein the column spacer is formed to correspond to the gate lines or the data lines.

3. The LCD device according to claim 1, wherein the column spacer and the filling pattern are formed of a photo-hardening resin.

* * * * *